Feb. 7, 1967  A. KORGANOFF  3,302,602
SUBMERSIBLE VESSELS
Filed Feb. 26, 1965  10 Sheets-Sheet 1

INVENTOR
ALEXANDRE KORGANOFF
BY Larson and Taylor
ATTORNEYS

INVENTOR
ALEXANDRE KORGANOFF

BY Larson and Taylor

ATTORNEYS

United States Patent Office 3,302,602
Patented Feb. 7, 1967

3,302,602
SUBMERSIBLE VESSELS
Alexandre Korganoff, 6 Rue de Castellane,
Paris, France
Filed Feb. 26, 1965, Ser. No. 435,722
24 Claims. (Cl. 114—16)

This application is a continuation-in-part application of Serial No. 130,176, filed August 8, 1961, now abandoned.

This invention relates to vehicles. More particularly, the invention relates to vessels capable of traveling on, below or above water and above land.

It is known what advantages are obtained by craft which can navigate in a homogeneous medium with only a very small frictional drag or resistance to its progress. More specifically, vessels moving in the air or under water can be built to encounter less resistance to their progress than vessels which move on the surface of the water, and which consequently are subject to the relatively high resistance of the waves.

It is known that by applying the "ground effect" principle, it is possible to raise an object from the surface of the ground or water, and to maintain it at a certain distance in the air without the use of supplementary sustaining devices. This effect may be obtained by employing only a small fraction of the object's weight in pounds of thrust, and, if the latter exceeds the weight of the object, there is no longer any limit to the altitude which may be attained. The object would, of course, be provided with stabilizing means.

The most important advantage of the "ground effect" principle for marine craft is the complete elimination of water resistance and the consequent possibility of vastly superior speeds above the water as well as above the land. It is the adaptation of the "ground effect" to submersible vessels which is one of the primary objects of this invention. Up to the present time, existing "ground effect" prototype vehicles move in two dimensions, whereas the present invention offers the first "ground effect" vehicle able to manoeuvre in three dimensions in that, being submersible, it is capable of altering its depth under the water.

This improvement enables a submersible vessel to rise out of the water, to fly at a certain height through the air, as well as to hover above the water or land.

The military need for submersible vessels capable of high surface speeds is universally acknowledged. Although modern submersible vessels, such as those powered by atomic energy, have achieved speeds superior to those of conventional submarines, it is evident that the most serious problem, the frictional resistance of the water to the hull of the vessel, remains a serious obstacle to significant advances. As a means of minimizing the resistance of the water, the application of hydrofoils to submersible vessels has proved very promising, but even here some frictional resistance is necessarily caused by the hydrofoils, and the vessel remains dependent upon the condition of the sea when travelling on the surface. None of the presently existing submersible vessels can achieve the crossing of land surfaces, isles, and isthmuses.

This invention provides a submersible vessel whose every part may be free of the water, with the ability to rise up to the critical altitude permitted by the "ground effect." But, with the additional air of specially designed means described below, this submersible vessel can, furthermore, fly and manoeuvre in the air at higher altitudes, overcoming the limitations of the pure "ground effect" vehicles, such as stormy waves and natural land obstacles, including cliffs, rocks, trees, and structures.

The essential elements of this submersible vessel are exit thrust nozzles which realize the ground effect and raise the submersible vessel above the surface of the water, and the auxiliary lift means which permit the submersible vessel to surpass the practical limitations imposed by the "ground effect" principle. These elements shall be described, and with the description the operation of this submersible vessel will be explained.

According to this invention, the hull of the submersible vessel is equipped with at least one exit thrust nozzle directing air or gas downwards, and causing at the same time the vessel's emersion from the water and its maintenance in the air.

According to another variation of this invention, the exit thrust nozzles are directed through at least one ballast compartment and may perform successively the evacuation of the gases which provide a lifting thrust coupled with Archimedes' effect at the moment of the emersion, and finally the lift to support the vessel in the air.

According to another variation of this invention, at least on exit thrust nozzle includes an assembly which may be composed of an outer shell, a centerbody including a nozzle base plate, and support strut(s). This nozzle may, furthermore, be of annular configuration or conform to the general outline of the underside of the hull.

Though the exit thrust nozzle with a centerbody can be of any shape, in the description that will follow it will be referred to, as an example for better understanding, as the annular exit thrust nozzle; when reference to an open nozzle is indicated, it will be referred to as a circular nozzle.

It is known, when a flow of air or gas is directed downward perpendicularly and close to the ground through an annular nozzle, that an augmentation of thrust results. This augmentation is affected by the nozzle configuration and the distance from the nozzle to the ground; the total thrust for such a nozzle near the ground consists of the direct thrust plus the pressure reaction between the ground and the nozzle base.

The nozzle-to-ground distance at which augmentation of thrust begins is a function of nozzle pressure ratio and the ratio of nozzle flow area to nozzle base area.

It is known, on the other hand, that the thrust obtained close to the ground from a nozzle without a centerbody, like a circular nozzle, decreases with the distance to the ground due to ground interference effects at the nozzle. Meanwhile, beyond a certain distance, the lift produced by an annular nozzle will decrease when the distance from the nozzle to the ground increases further.

According to a variation of this invention, the centerbody of an annular exit thrust nozzle can be mobile. When the centerbody is retracted, the annular nozzle is transformed into a circular nozzle, which, by maximizing thrust, permits surpassing the critical ground-to-nozzle distance of the limited ground effect principle. Thus, the thrust loss associated with operation of an annular nozzle without ground effect is avoided. Practically, the use of an annular nozzle may be considered for takeoff and landing operations and that of a circular nozzle for flying to and at altitude. Of course, if the thrust exceeds the weight of the submersible vessel, there is no longer any limit to the altitude which may be attained.

According to this invention the nozzles can be provided with watertight shutting valves.

The gas feeding of the exit thrust nozzles may be advantageously effected from a gas generator, under pressure, preferably situated inside the hull of the vessel, and which operates during the navigation under water, on the surface of the water and in the air.

Such an engine is described in my copending application, Serial No. 125,875, filed July 7, 1961, entitled, "New Combustion Engine" now abandoned. As disclosed therein, that power plant is employable on crafts which are capable of locomotion in different media (e.g. air and water) containing at least one combustion chamber into which may be selectively fed either outside air or a stored oxidizer, for the purpose of oxidizing a combustible fuel, or alternatively a stored monopropellant in lieu of both the oxidizer and the combustible fuel. The further possibility of utilizing synchronized valves in the transition between the employment of atmospheric air and of the stored oxidizer or monopropellant may be considered for a continuous control of the power plant.

As with the conventional turbine-driven engines, this power plant may operate a turbine and simultaneously create a thrust which may, by means of a reaction outlet or by means of a screw attached to a shaft, propel the craft. Thus also, the three dimensional movement of a craft to which the "ground effect" principle has been applied, i.e., vertical and horizontal propulsion, is effectively realized. It is apparent that the power plant is "self-contained" in not requiring outside air although outside air may be used when above water or by means of a breathing device.

The essential quality of this power plant is that within a single combustion chamber three distinct combustible mixes may be employed. One of these is realized by the less economical mixture which is necessitated when the craft has no means of obtaining the air of the atmosphere; for example, as in a liquid rocket engine of the conventional type, a mixture of an oxidizer and a fuel is employed. The other potential combustible mix in the same combustion chamber is that of a fuel (which might be the same as in the first case) with the atmospheric air. In either case, the combustion effect can be utilized to propel the craft. Alternatively, monopropellant may be used.

The submersible vessel is provided with propulsion devices and may be equipped with auxiliary lift means, more particularly with wings, air-screw, dual-function propeller, shrouded propeller, and tilting engines, which will be described with the description of the operation of the submersible vessel.

Figure 1:
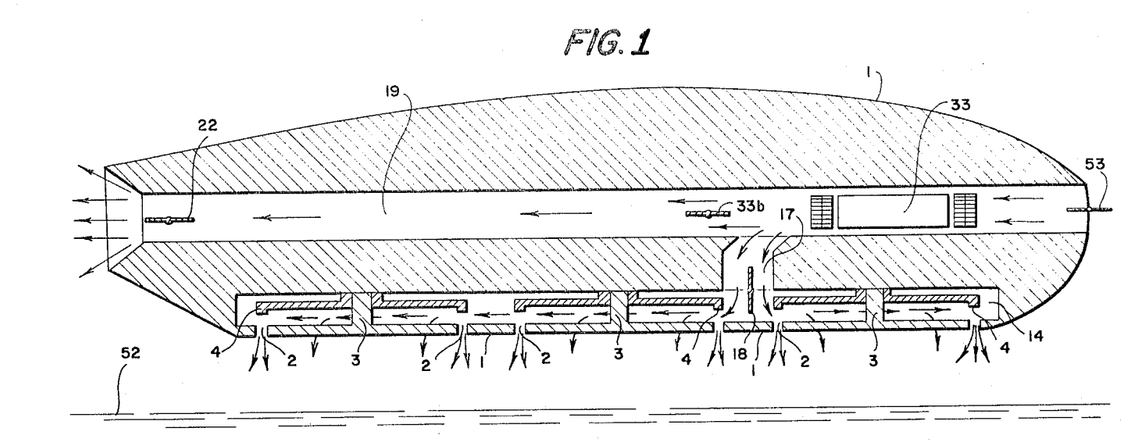
FIGURE 1 shows a schematic longitudinal cross-section of a submersible vessel equipped with exit thrust nozzles 2 situated at the bottom of a compartment 14 which acts as does the water-ballast of a conventional submarine.

Shown in FIGURE 1 is a source of propulsion 33, the thrust of which is directed into pipes 19 and 17, the latter leading into a lower compartment 14 at the bottom of which are three annular nozzles 2. These nozzles 2, represented here in an open position, which can be closed by the watertight valves 4, direct the thrust, depicted by arrows, on the surface 52 (in this specification, surface 52 will comprehend either the surface of the water or of the ground since the general ultimate effect is the same). The thrust is partially reflected by the surface 52 toward the underpart of the hull 1 of the submersible vessel, and the vessel is raised on a cushion of gas or air to a certain height above the surface 52. The same source of propulsion 33 gives the vessel its forward movement below, on, and above the surface of the water by means of a rearward thrust directed through a pipe 19. The deflector 18, the valve 22, and a diverter 33b controls the flow of gas directed to the compartment 14, and toward the aft of the vessel for propulsion. The watertight valve 53 controls the potential air intake when desired for the source of propulsion 33.

Figure 2:
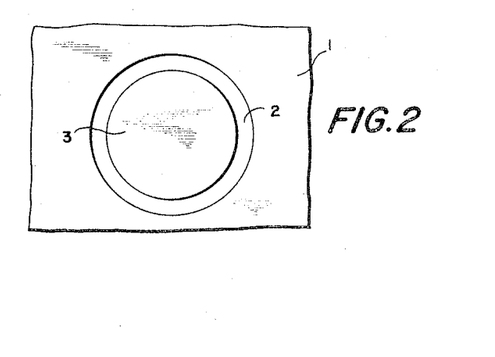
FIGURE 2 is a partial view of the underside of the hull 1 of the vessel showing an annular nozzle 2 with its centerbody 3.

The FIGURE 2 shows an underside view of an annular thrust nozzle 2 with a centerbody 3.

Figure 3:
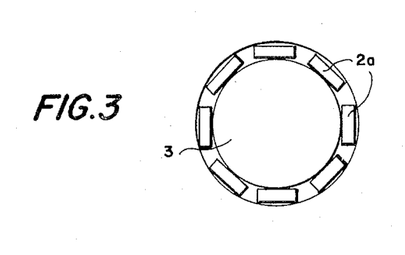
FIGURE 3 is a view of discontinuous annular nozzle apertures 2a, disposed around the centerbody 3.

The FIGURE 3 represents an annular nozzle with discontinuous apertures 2a.

Of course, it is possible, within the limits of this invention, to modify the number and the shape of the exit thrust nozzles. For instance, it will be advantageous in certain cases to incorporate at least one exit thrust nozzle, the aperture of which follows the periphery of the underpart of the hull 1. In other cases, it may be preferable to utilize a combination of annular configurations and/or other shapes.

Figure 4:
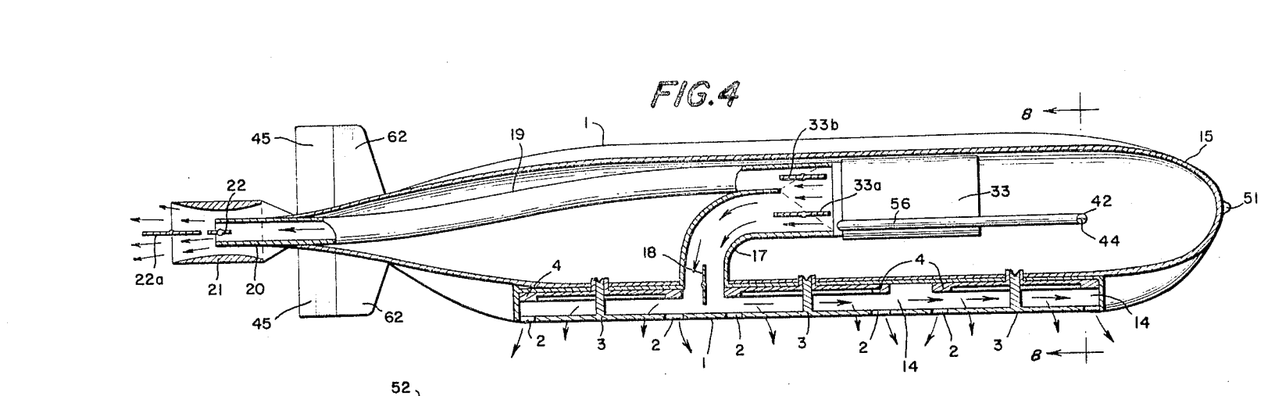
FIGURE 4 is a longitudinal cross-section of a submersible vessel equipped with exit thrust nozzles 2 and a lower ballast-compartment 14.
Figure 5:
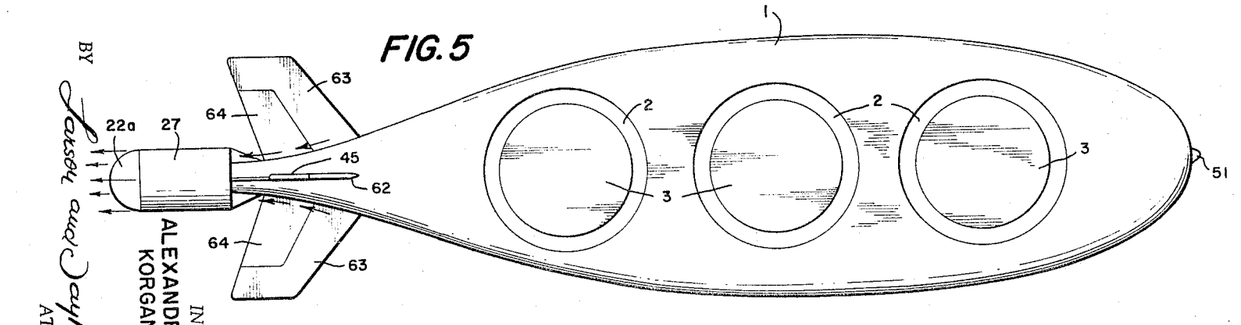
FIGURE 5 is a corresponding view of the underside of the vessel illustrated in the FIGURE 4.

Referring to the FIGURES 4, 5, 6, 7 and 8: As shown in FIGURE 4, the same engine 33 gives the vessel its forward movement below, on, and above the surface of the water, by means of a rearward thrust directed through a pipe 19 which leads to a nozzle 21 situated on the rear end (or sides) of the vessel. To allow the submersible vessel a backward movement, a deflector 22a within the nozzle 21 reverses, when closed, the direction of the thrust, the latter being controlled by watertight valve 22; intermediate positions of this deflector 22a divert the thrust and thus manoeuvre the vessel either upward or downward. Diverters 33a and 33b control the thrust directed through pipe 19 to the rearward nozzle 21, for propulsion, and, through pipe 17, for lifting. Diverters 33a and 33b permit the desired adjustment of propulsive and lifting thrust respectively directed through pipes 17 and 19.

Within the compartment 14 valves 4 open or close the annular nozzles 2. In the FIGURE 7, the operation of the annular nozzle valves 4 is illustrated in a transverse cross section view of a portion of the outside hull 1 and the inside hull 15. The annular nozzle 2 may be closed when a double-action hydraulic cylinder 55 is operated through the tubes 12 and 13. Similarly, when fluid pressure is passed through tube 13, the piston 54 of the cylinder 55 is raised; consequently valve 4 opens annular nozzle 2.

Figure 6:
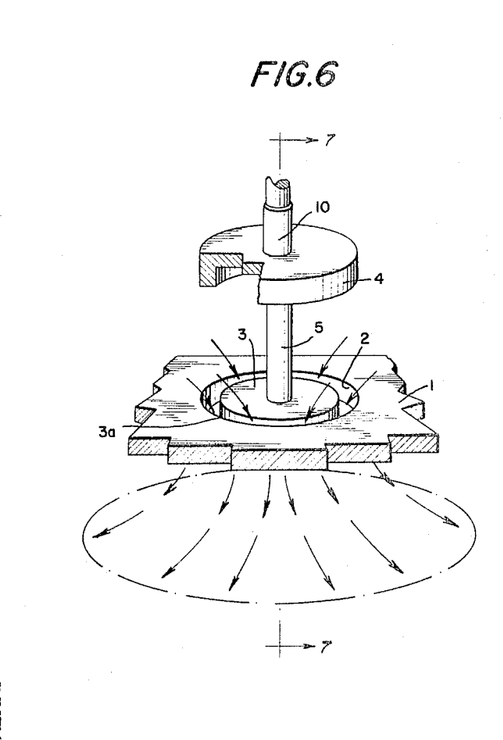
FIGURE 6 shows a perspective view of an annular exit thrust nozzle 2 including: outer shell 3a, centerbody 3, rod 5 and shaft 10, and watertight valve 4. The arrows under the nozzle 2 illustrate a schematic view of a three-dimensional annular stream close to a surface.
Figure 7:
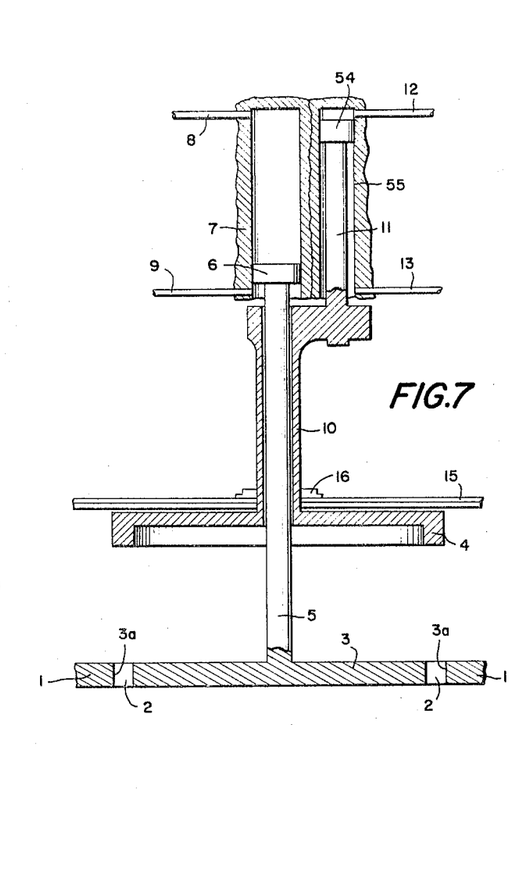
FIGURE 7 is a cross-section of an annular nozzle 2 and watertight valve 4 assembly with a controlling means.

Examining the FIGURES 6 and 7, one may see one of the ways of realization of the different primary parts of an exit thrust nozzle 2. The centerbody 3 is of a circular shape, of a diameter smaller than the aperture made in the outer hull 1, and limited by the outer shell 3a. Of course, the configuration of the centerbody is not limited to the depicted design and in certain cases it may be preferable to have a conical or conic sectional shape; the top of the conic section then being preferably situated on the outer side of the hull 1, with respect to the base plate of the centerbody. The centerbody 3 is rigidly connected to a rod 5 ended by a piston 6 moving in a double-action cylinder 7. Flow tubes 8 and 9 connected to the cylinder 7 supply the fluid under pressure, which permits the control of the position of the centerbody 3. The watertight valve 4 is rigidly connected to a hollow shaft 10 which slides on the rod 5 and which is rigidly connected to the rod 11 ended by the piston 54 moving in the cylinder 55. When fluid pressure is passed through the tube 12, the piston-rod 11 is pushed down, hence closing the aperture 2 with the valve 4. When the pressure is passed through the tube 13, the piston-rod 11 is pushed up, opening the valve 4. It will be realized, that in all arrangements involving double-action hydraulic cylinders, fluid reservoirs are supplied in the normal way. When there are several exit thrust nozzles, the commanding mechanisms of the different centerbodies and/or of the different valves might preferably by synchronized. In synchronized command devices, described above, the fluid-flow-canals of the dual-action cylinders may be connected in parallel to the same source of fluid under pressure. As it may be seen in the FIGURES 1, 4, 7, 8 and 9, centerbodies and valves are situated in a ballast compartment 14. Of course, when such is the case, an adequate watertight device 16, visible on the FIGURE 7, is installed adjacent to the pressure hull 15 through which slides the hollow shaft 10.

With the means described above, the submersible vessel is able to submerge beneath, to float upon the water, and to raise itself upon an air or gas cushion above the surface. When on the surface of the water, the annular nozzle valves 4 may be opened without a thrust being directed through pipe 17; the watertight deflector(s) 18 is closed and the compartment 14 is flooded, performing the function of the water-ballast of a conventional submarine. From a position beneath the surface of the water, to rise, the valves 4 may be again opened and while a thrust is sent through pipe 17, and the watertight deflector(s) 18 opens. The escaping water, driven directly downward through nozzles 2, itself helps to raise the vessel more quickly, and, should an exceptionally fast ascent be desired, after the water has been driven out, the thrust may continue to drive the vessel upwards. This quality, which permits rapid ascent represents an important improvement over conventional submarines. The gases, being then ejected through the nozzles 2 under an adequate pressure, create a gas cushion between the underside of the hull 1 of the submersible vessel and the surface 52. The submersible vessel is then supported by this gas cushion, in application of the phenomenon of the ground effect. The thrust partially diverted through the pipe 19 to the rearward nozzle 21, provides by reaction the forward movement of the vessel which can now fly through the air. The same system propelling in the air may also propel the vessel under the water and also on the water. As a matter of fact, the submersible vessel is provided with stabilizers 62, 63 of known type. The vessel may be also equipped with the conventional, vertical and/or horizontal directional rudders 45, 64.

The compartment 14 may naturally be connected to water-ballast compartment situated in any part of the hull 1 or adjacent thereto; for instance, for stability reasons, on the sides of the hull-like the "saddle" type water-ballast tanks.

Figure 9:
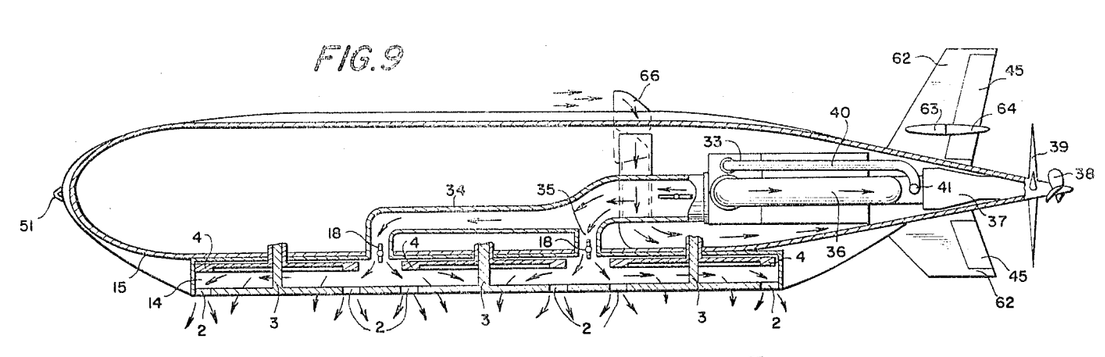
FIGURE 9 is a longitudinal cross-section of a variation of the vessel illustrated in FIGURE 4.

One method to permit variations in the attitude of the submersible vessel when it hovers or travels on its air cushion, as well as on or beneath the water, consists in adjusting the positions of the deflector 18 which may be placed at each entrance, if there are several, of the pipe 17 at its connection into the lower compartment 14, as illustrated in the FIGURES 1, 4 and 9.

A certain determined position of the deflector 18 represents an equal distribution of the thrust to the nozzles 2. In varying the deflector 18 from this position, either the fore nozzle or the aft nozzle may receive a greater proportion of the thrust and in this manner the attitude of the submersible vessel may be regulated as desired to suit different purposes and conditions.

Figure 8:
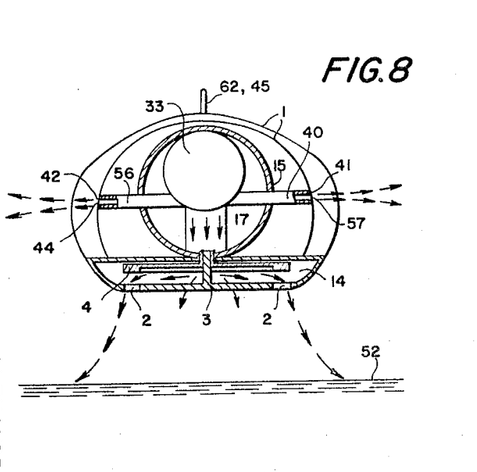
FIGURE 8 is a transversal cross-section of the vessel corresponding to the illustrations in the FIGURES 4 and 5. Arrows under the hull 1 of the vessel represent a schematic view of the stream passing through the annular nozzle 2 close to the surface 52.
Figure 10:
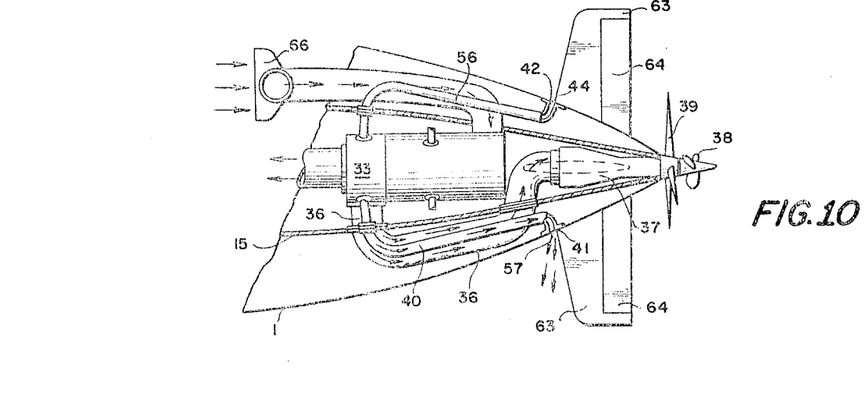
FIGURE 10 is an enlarged horizontal longitudinal cross-section of the aft part of the vessel illustrated in FIGURE 9, showing an upper side view of a possible engine arrangement.

When it is desired to laterally manoeuvre the submersible vessel in the air, on the water or under the surface of the water, the thrust of the engine 33 may again be utilized. FIGURE 8 is a transversal cross section of the vessel shown in FIGURE 4. Two pipes 56 and 40 which may independently be opened or closed by valves 44 and 57 respectively direct a portion of the thrust to the starboard and port outlets 42 and 41; with the outlet of each pipe 56 and 40 being situated toward the fore and/or aft end of the submersible vessel. For example, by closing port fore-end valve 57 and opening valve 44, as shown in FIGURE 8, one may effect a port turn by a thrust forced out the starboard side outlet 42 of the hull 1. With the opposite combination, of course, one may effect a starboard turn. FIGURES 9 and 10 show such a pipe and valve assembly for lateral manoeuvres mounted on the aft end of the vessel.

It is thereby possible to steer without all conventional means, e.g. rudders may be eliminated, in order to use only the fore and/or aft-end steering assembly.

As mentioned above the vessel may be provided with conventional vertical and horizontal stabilizers 62, 63 and if desired with vertical and horizontal directional rudders, 45, 64 as illustrated in the FIGURES 4, 5, 8, 9, 10, 11, 12, 13, 14, 15, 17 and 18.

Although the submersible vessel when raised on its cushion of air or gas, is capable of speeds much greater than that of existing atomic-powered submarines, with the addition of fixed or retractable wings, its lift may be further augmented, and the vessel raised beyond the normal ground effect limitations.

Figure 11:
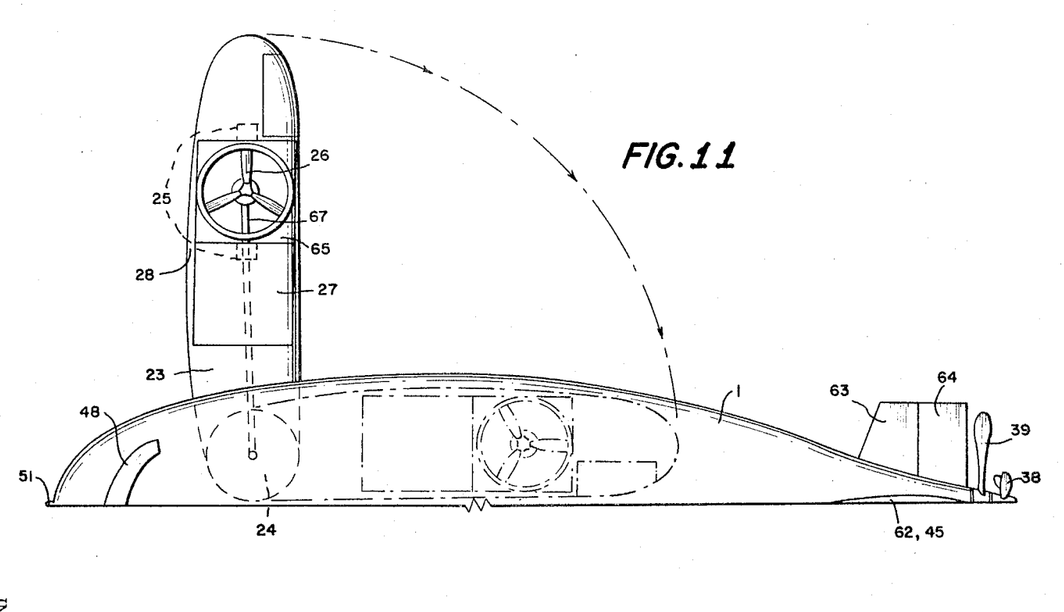
FIGURE 11 illustrates a perspective view of the starboard half of the upperside of the hull 1 of a submersible vessel equipped with auxiliary lift means: retractable wing 23 which may include a shrouded propeller 26.

To retain the desired streamlined form for a vessel which travels underwater, two pivotal wings 23 may be mounted within the hull 1, as shown in FIGURE 11. Such wings may include a supplementary means of lift augmentation as, for example, the shrouded propeller depicted on FIGURE 11. When rotated to their stowed position, shown in dotted lines, by axle 24 which may be operated by a manual or mechanical means, the wings 23 may be within the hull 1 and hence reduce the surface area and thereby decrease the vessel's water resistance when it travels underwater. Within each wing 23 may be a shrouded propeller 26 which acts to aid to augment the ground effect in the raising of the vessel, and may also function as the propellers of a conventional airplane when the shrouds are rotated through 90 degrees (90°) on an axle 25. This shrouded propeller 26 may, if desired, be placed in a cage 65 closed by a panel 27. The shrouded propellers 26 rotating on axles 25 may be placed in a perpendicular or horizontal position with respect to the wings 23, in order to obtain a forward or lifting movement, or may be placed for a combination thrust lift in an intermediate position. The shrouded propeller 26 is preferably driven by the same engine 33 which through a turbine rotates the shaft 67, or by any other known means of propulsion or transmission.

It will be appreciated that the submersible vessel described above does not represent the only means of realizing the desired ends. Variations in the types of nozzles, types of engines, and types of wings and other existing lift and thrust augmentation devices are easily imagined.

For example, there are several effective types of annular nozzles, each with its particular advantages and disadvantages. As shown in FIGURES 2 and 3, the annular nozzles 2 respectively have no diffusers or have diffusers which form separate entities with the annular nozzle. The diffusers also may be more or less widely spaced. Also, the number of annular nozzles may easily vary by a simple multiplication or diminution of parts.

To economize fuel consumption, a reaction or gas turbine may be added in order to permit the air of the atmosphere to be utilized as oxidizer when the submersible vessel is near, on, or above the surface of the water. As shown in FIGURE 9, an engine 33 may breathe air through a retractable and rotatable intake pipe 66. This engine can advantageously be replaced by a "New Combustion Engine" as described in a copending Patent Application applied for on July 21, 1961; this "New Combustion Engine" being able to operate with and without atmospheric air, i.e., in the air, as well as on, and under the water.

Figure 13:
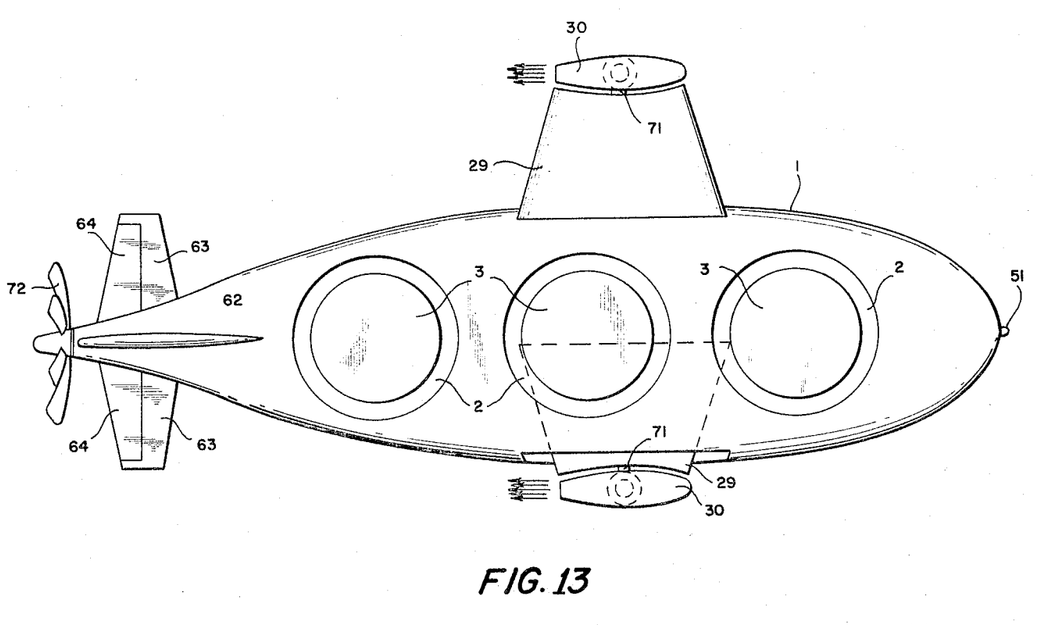
FIGURE 13 is a corresponding view of the underside of the submersible vessel illustrated in the FIGURE 12, showing the starboard wing 29 extended from and the port wing retracted into the hull 1.

As shown in the FIGURE 9, the engine supplies the thrust to the nozzles 2 through the pipes 34 and 35 controlled by water-tight deflectors 18 and, instead of direct reaction propulsion, as shown in FIGURE 4, may be provided with at least one turbine 37 turning a shaft which drives propellers 38 and/or 39. The turbine 37 is fed through the pipe 36. Variation of the propeller may include one or more independently acting propellers as shown in FIGURES 9 and 10, a screw 38 for the water navigation and/or a conventional propeller 39 for the air; or, as shown in FIGURE 13, a single dual-function propeller 72 (air and water), possibly as for example, a variable pitch propeller which changes its pitch and revolution speed to adjust it to each of the two media. In the former case the air propeller 39 may be foldable or retractable, so that it might reduce a drag when the vessel travels on or under the surface of the water.

Figure 12:
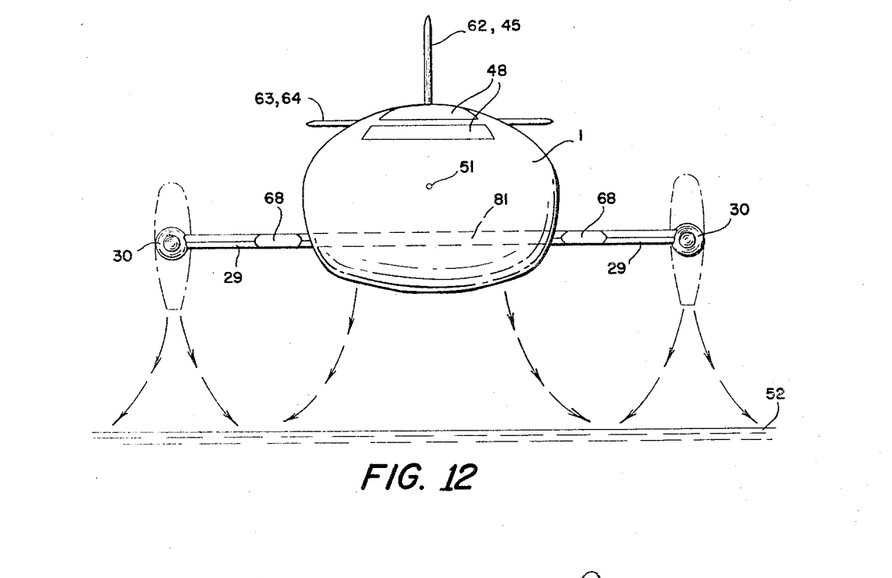
FIGURE 12 is a front view of a submersible vessel equipped with auxiliary lift means which are tilting engines 30 mounted on retractable wings 29. Arrows under the submersible vessel show a schematic annular lifting stream section close to the surface 52.

As a variation in retractable wings, the FIGURE 12 and the corresponding underside view shown in the FIGURE 13 illustrates wings 29 which slide directly into a sheath within the hull 1. The FIGURE 13 shows the starboard wing in an extended position and the port wing retracted into the hull 1. Referring to the FIGURES 12 and 13, a tilting reaction propulsion unit 30, which may be rotated on a transverse axle 71 within three hundred and sixty degrees (360°), is mounted on the end of each wing 29. These propulsion units 30 have the same function as the shrouded propellers of FIGURE 11, i.e. to aid the nozzles 2 in vertical take-off and to give additional propulsive force in forward flight, to furnish thrust into intermediate vectors, and when reversed to serve as brakes or for rearward propulsion. These propulsion units 30 need not be within the hull 1 when the sliding wings are in their stowed position, and may serve beneath, on, and above the surface of the water. That is, the engines 30 can remain operative independent of position of the wings.

If these engines are of the type of "New Combustion Engines," mentioned above, the air intakes 68 situated on the wings 29 may take in atmospheric air when the wings are extended during the air navigation, and when the wings 29 are retracted into the hull 1, the same air intakes 68 may be connected to an oxidizer supply tank, when the atmospheric air is not available as for the submarine navigation; thus permitting the engines 30 to operate in the air, on the surface and beneath the water. The tilting engines 30 can be equally installed on the lateral sides of the hull 1 of the submersible vessel and may thus contribute to the faster manoeuvering of the vessel.

Figure 14:
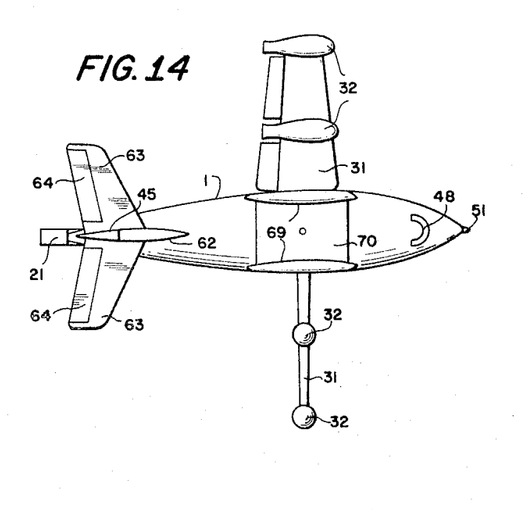
FIGURE 14 represents an upperside view of a submersible vessel equipped with engines 32 mounted on tilting wings 31.

According to a variation of this invention as shown in the FIGURE 14, wings 31 on which are rigidly fixed engines 32, are mounted so as to permit tilting on the hull 1.

In the FIGURE 14 the above said wings 31 are mounted tiltable on the sides or on two streamlined fins 69, shaped as those of atomic powered submarines. It may be seen in the FIGURE 14 that these fins 69 are not situated in the middle following the longitudinal axis as in conventional submarines but on starboard and port sides of the submersible vessel. For example, these tilting wings 31 can be partially retracted, when in a horizontal position, into a central streamlined wing-shaped sheath 70 connecting the two fins 69, as illustrated in FIGURE 14. One may use shorter wings 31, so as to be completely retracted in the sheath 70, as well as any other known means of complete retractation.

Other wing variations would include a folding method similar to that used for aircraft-carrier type planes, according to which the wings could be made to further fold into the hull 1 of the submersible vessel.

Figure 15:
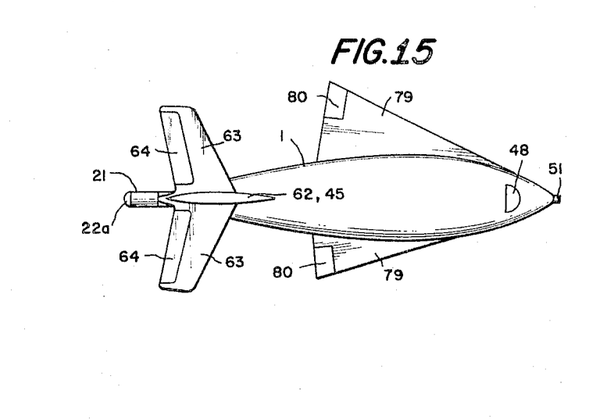
FIGURE 15 shows a submersible vessel equipped with retractable or variable area, delta wings 79.

FIGURE 15 illustrates an upperside view of a submersible vessel equipped with a retractable, or variable area, delta-type wing 79 adjustable during flight. The starboard wing is shown in partially retracted position and the port wing is fully extended. Note that ailerons 80, when the port is partially or fully extended, can operate in the air as well as in the water, even when the wings 79 are in a partially stowed position for submarine navigation.

Figure 19:
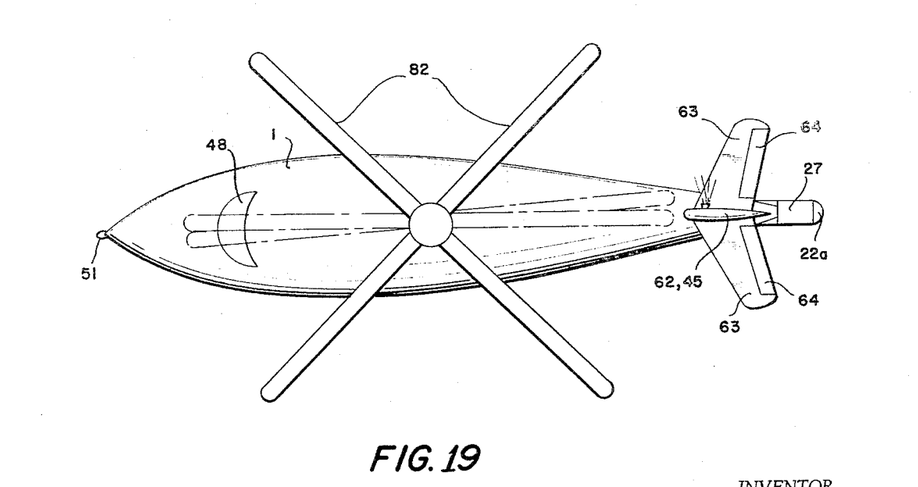
FIGURE 19 depicts a submersible helicopter viewed from above.

As shown in FIGURE 19 a system in which blades 82 of a rotor, similar to those of a helicopter, are represented in the operating position, can be stowed in a position directly adjacent to the hull 1 of the submersible vessel, and may be in certain cases advantageously applied. The dotted lines indicate one method of stowing the folded blades within or above the hull 1 so as to minimize drag when in or under the water. Any known means of adjusting and locking the blades in the desired position can be used.

It will be appreciated that the auxiliary sustaining devices described above do not represent the only means of realizing the desired ends. Variations in the types are easily imagined.

According to another characteristic of this invention, the submersible vessel may be equipped with a landing gear assembly, of known types, such as rails, skis and/or wheels, which are preferably retractable by known means.

Figure 16:
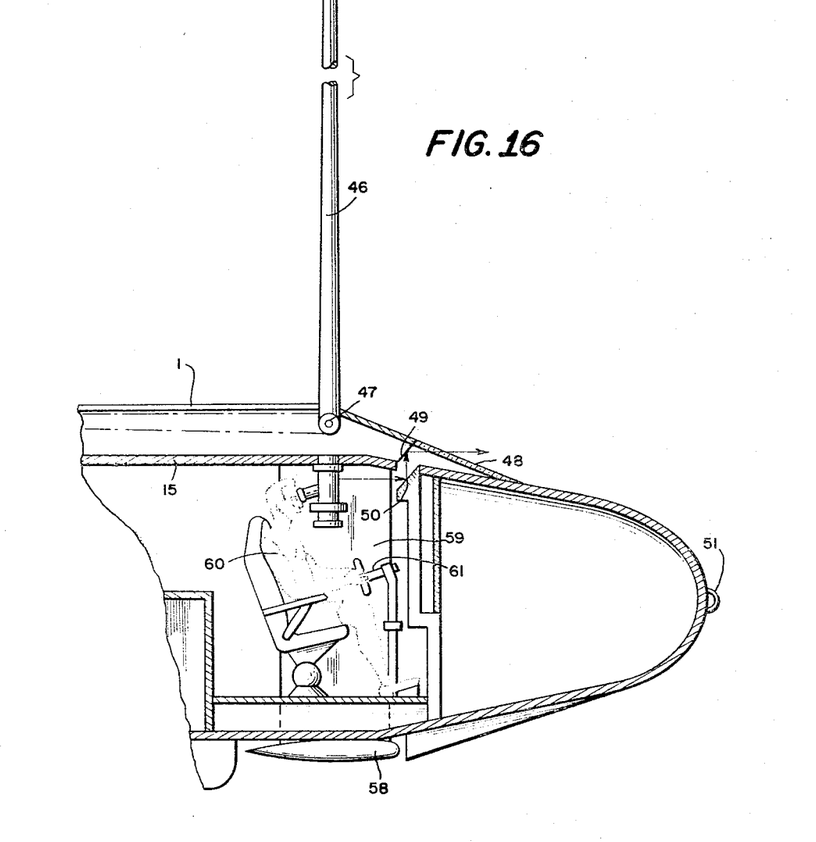
FIGURE 16 is a longitudinal cross-section of the fore part of the vessel here equipped with a hydrofoil 58, which is shown here in a stowed position under the pilot 60 holding the vessel control stick-and-wheel 61. The hydrofoil strut is here shown withdrawn into a central stowage sheath 59. Note the rotatable periscope 46 and a window 48 incorporated in the hull 1, behind which there is at least one optical system 49, 50 of reflection and/or refraction.

From the FIGURE 16 it will be seen that a window 48 is incorporated in the hull 1. An optical device composed of, for example, two parallel mirrors 49 and 50 permits correct visibility through the watertight wall to the outside of the vessel. This optical system is not limited to this specific arrangement, but may encompass any of the known variations. One may, for example, replace the mirrors 49 and/or 50 by prism(s).

As shown in the FIGURE 16 the submersible vessel is equipped with a periscope 46 retractable into the hull 1. The periscope 46 is mounted rotatable on a transverse axle 47 and can be stowed in the hull 1 as shown in the FIGURE 16 in dotted lines. This rotatable retraction can be effected by any known means. The entirely retractable periscope avoids the high external drag and the common internal inconvenience of the conventional periscopes which, like the conventional conning tower, may be avoided in a submersible vessel of the type described. Furthermore, this arrangement allows the incorporation of a longer entirely retractable periscope, which is an important improvement from the operational as well as from the hydrodynamic and the aerodynamic standpoints. The longer periscope permits visibility from deeper waters, with respect to the size of the vessel, and the vulnerability factor is decreased from military standpoint.

This submersible vessel may be equipped with a fixed and/or retractable hydrofoil system installed on the underpart of the hull 1. This system may be composed of one or more hydrofoil assemblies. Each hydrofoil assembly may consist of at least one strut, one hydrofoil proper and manoeuvering mechanisms as required. FIGURE 16 shows a forward hydrofoil 58 in a retracted position, its strut being stored in a sheath 59. A rear hydrofoil which is not represented in the FIGURE 16 may also be included and may or may not be retractable. It is a minor engineering matter to permit rigid struts to be withdrawn directly into a cavity in the hull 1 or to have the struts fabricated in two or more telescopic sections which can similarly be withdrawn. Should hydrodynamic ailerons similar to the ailerons of airplanes be incorporated in the hydrofoil proper for steering purposes when the vessel has to travel on the foils, command shafts, plus any other conventional devices, can easily be installed in the struts. The struts may be extended or retracted by any known means, such as springs and/or compressed fluid, air or gas. Similar means are commonly used in the extension and retraction of the landing gear of airplanes and all considered, those means would remain strictly conventional.

Figure 17:
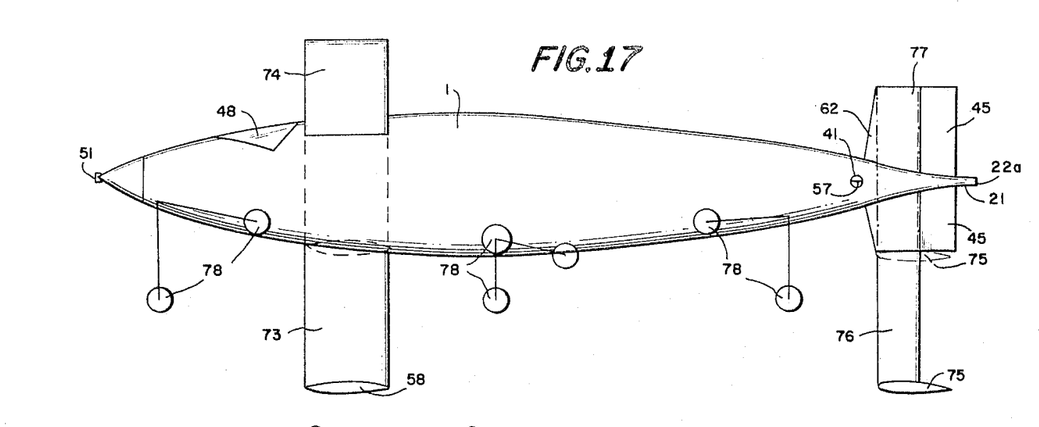
FIGURE 17 shows a lateral port view of a vessel equipped with a retractable hydrofoil assembly and retractable landing gears.

FIGURE 17 illustrates a submersible vessel equipped with one of several possible types of hydrofoil assembly. The front strut(s) 73, represented herein an extended position retracts into streamlined sheath 74 which may protrude above the upper part on the hull 1 if a long strut(s) is desired. In this specific case the protruding sheath 74 may serve as directional stabilizer. Being streamlined they do not offer any appreciable drag. Similarly the rearward strut 76 slides up and down in its sheath 77 which may be housed within the directional stabilizer 62. The rearward hydrofoil proper 75, preferable equipped with incorporated ailerons, may also serve as a horizontal stabilizer-rudder assembly during flight in the air as well as during submarine navigation.

Retractable landing gear assembly 78 may comprise wheels as shown in FIGURE 17.

The aft exit thrust outlet 41, with its watertight valve 57, permits lateral manoeuvres.

Figure 18:
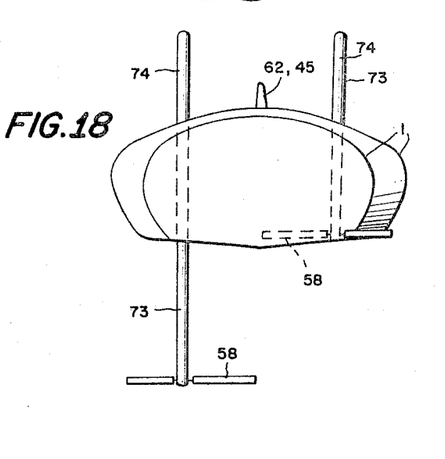
FIGURE 18 is a front view of the corresponding transversal cross-section of the vessel, as illustrated in the FIGURE 17.

FIGURE 18 is a corresponding view of the front transverse cross section showing the front hydrofoil assembly. The starboard strut 73 is extended and the port strut 73 is retracted in the sheath 74.

One of the advantages of equipping a submersible vessel with a hydrofoil assembly is to economize fuel by cruising on the foils when the condition of the sea allows it and when a great speed is not required. The hydrofoil may also aid during the transition between the waterborne and airborne conditions. Should the crossing of land area as well as a greater speed be desired, the ground effect principle may be then applied.

A traction device 51 is mounted on the fore part of the hull 1 which permits towing of the submersible vessel in the three media: on the surface and beneath the water and in the air. Similar devices may be located on hull 1 to permit lifting by helicopter and other types of aircraft and by crane type devices.

This invention is not limited to the embodiments described and illustrated herein; but encompasses all the variants.

I claim:

1. A vessel adapted to operate submerged and on the surface of water and above the surface of land and water without contact between the vessel and such surface comprising:
   (a) a hull,
   (b) gas thrust generator means within said hull and operable to produce gas under pressure when said vessel is above, on and submerged in water,
   (c) nozzle means on a lower portion of said hull and directed downwardly to produce a lifting thrust, and
   (d) valved duct means interconnecting said gas thrust generator means and said nozzle means to direct gas thrust from said gas thrust generator means to said nozzle means, said lifting thrust at least partly supporting the vessel above said surface as it travels or hovers thereover, said nozzle means being operable when said vessel is above, on and submerged in water.

2. A vessel adapted to operate submerged and on the surface of water and above the surface of land and water without contact between the vessel and such surface comprising:
   (a) a hull,
   (b) gas thrust generator means within said hull and operable to produce gas under pressure when said vessel is above, on and submerged in water,
   (c) nozzle means on a lower portion of said hull and directed downwardly to provide a lifting thrust,
   (d) valved duct means interconnecting said gas thrust generator means and said nozzle means to direct gas thrust from said gas thrust generator means to said nozzle means,
   (e) second valved duct means extending from said gas thrust generator means to an air intake to admit atmospheric air to said gas thrust generator means, said lifting thrust at least partly supporting the vessel above said surface as it travels or hover thereover, said nozzle means being operable when said vessel is above, on and submerged in water, said gas thrust generator means breathing atmospheric air through said second duct means.

3. A vessel as claimed in claim 2 wherein said second duct means comprises an external section pivotable and/or retractable adjacent to, or within the said hull.

4. A vessel as claimed in claim 2 further including means to close said nozzle means.

5. A vessel as claimed in claim 2 wherein said nozzle means conforms to the outline of the underside of said hull of the vessel.

6. A vessel as claimed in claim 2 wherein said nozzle means comprises a circular opening in said hull, a moveable centerbody disposed centrally thereof, said centerbody including a nozzle base plate situated at the outer side with respect to said hull, and means to move said centerbody to an extended position wherein the nozzle orifice is of annular configuration and to a withdrawn position wherein said nozzle orifice is of circular configuration whereby, near the ground, the total thrust when said nozzle orifice is annular consists of the direct thrust and the pressure reaction on said nozzle base plate.

7. A vessel as claimed in claim 2 including propulsion means comprising nozzle means.

8. A vessel as claimed in claim 2 including propulsion means comprising rotatable propeller means.

9. A vessel as claimed in claim 2 including propulsion means and means interconnecting said gas thrust generator means and said propulsion means to motivate the vessel in response to gas thrust.

10. A vessel as claimed in claim 2 including valved propulsion nozzle outlet means for producing lateral thrusts enabling the vessel to be maneuvered.

11. A vessel as claimed in claim 2 further including auxiliary lift means.

12. A vessel as claimed in claim 2 further including at least one hydrofoil assembly thereby permitting the vessel to cruise at high speed on the surface of the water.

13. A vessel as claimed in claim 7 wherein said nozzle means are mounted pivotable within three hundred and sixty degrees (360°) on the vessel.

14. A vessel adapted to operate submerged and on the surface of water and above the surface of land and water without contact between the vessel and such surface comprising:
- (a) a hull,
- (b) gas thrust generator means within said hull and operable to produce gas under pressure,
- (c) compartment within the lower portion of said hull having an outer wall comprising a portion of said hull,
- (d) nozzle means in the hull wall of said compartment
- (e) first valved means extending from said gas thrust generator means to said compartment, and
- (f) second valved duct means extending from said gas thrust generator means to an atmospheric air intake.

15. A vessel as claimed in claim 14 including means for closing said compartment from the thrust means whereby said compartment may function as a water ballast compartment, said thrust means adapted to push out the water from said compartment when said closing means is open to aid the vessel in the ascent thereof toward the surface of the water.

16. A vessel as claimed in claim 15 wherein said nozzle means comprises an annular aperture defined by a circular opening in said hull and a moveable centerbody disposed centrally thereof, said centerbody including a nozzle base plate situated at the outer side with respect to said hull.

17. A vessel as claimed in claim 15 and further including means for adjusting the distribution of the thrust admitted to said compartment.

18. A vessel as claimed in claim 14 wherein said nozzle means is provided with closing means.

19. A vessel as claimed in claim 14 wherein said nozzle means comprises a variable-area aperture permitting different configurations of the exhaust thrust stream.

20. A vessel adapted to operate submerged and on the surface of water and above the surface of land and water without contact between the vessel and such surface comprising a hull, gas thrust generator means within said hull and operable to produce gas under pressure, a compartment within the lower portion of said hull having an outer wall comprising a portion of said hull, nozzle means in the hull wall of said compartment, means to admit atmospheric air to said thrust generator means, means to exclude atmospheric air from said gas thrust generator means, first valved duct means extending from said gas thrust generator means to said compartment, propulsion means, and second valved duct means extending from said gas thrust generator means to said propulsion means whereby said vessel is capable of movement below, on the surface and above water and above land.

21. A vessel as claimed in claim 11 wherein said auxiliary lift means comprise wings.

22. A vessel as claimed in claim 9 wherein said rotatable propellor means are mounted tiltable on the vessel.

23. A vessel as claimed in claim 11 wherein said auxiliary lift means comprises variable area wings adjustable during flight with ailerons or flaps operative at any position of said wings.

24. A vessel as claimed in claim 11 including helicopter type rotor stowable into or closely adjacent the said hull when not in use.

References Cited by the Examiner
UNITED STATES PATENTS

| | | | |
|---|---|---|---|
| 1,412,848 | 4/1922 | Dunajeff | 180—7 |
| 1,585,281 | 5/1926 | Craddock | 244—23 |
| 2,969,032 | 1/1961 | Pinnes | 180—7 |
| 3,082,975 | 3/1963 | Cardwell et al. | 114—16 X |
| 3,122,121 | 2/1964 | Krauth | 114—16 X |
| 3,127,863 | 4/1964 | Tinajerp | 114—16 |
| 3,181,636 | 5/1965 | Cockerell | 180—7 |

MILTON BUCHLER, *Primary Examiner.*

L. C. HALL, A. E. CORRIGAN, *Assistant Examiners.*